United States Patent [19]
Sievenpiper

[11] 3,722,375
[45] Mar. 27, 1973

[54] SYNTHETIC PLASTIC SLEEVE BEARING HAVING IMPROVED HEAT TRANSFER CHARACTERISTICS

[75] Inventor: Ward Sievenpiper, Alden, N.Y.

[73] Assignee: Automatic Sprinkler Corporation of America, Cleveland, Ohio

[22] Filed: Apr. 7, 1969

[21] Appl. No.: 813,990

[52] U.S. Cl. ..................92/168, 92/53, 308/238
[51] Int. Cl. ..................F16j 15/18, F16c 27/02
[58] Field of Search ...92/168, 165, 53, 170; 308/238

[56] References Cited

UNITED STATES PATENTS

| | | | |
|---|---|---|---|
| 2,622,949 | 12/1952 | Cotchett | 308/238 |
| 2,639,198 | 5/1953 | Kirkham | 308/238 |
| 2,702,730 | 2/1955 | Ivanoff et al. | 308/238 X |
| 2,888,879 | 6/1959 | Gaarder | 92/170 X |
| 3,072,449 | 1/1963 | Morley et al. | 308/238 |
| 3,136,221 | 6/1964 | Walker | 92/53 X |
| 3,268,280 | 8/1966 | Miller | 308/238 X |
| 3,347,737 | 10/1967 | Harford | 308/238 X |
| 3,397,856 | 8/1968 | Sullivan et al. | 308/238 |
| 3,400,937 | 9/1968 | Crankshaw | 308/238 |

*Primary Examiner*—Alan Cohan
*Assistant Examiner*—Irwin C. Cohen
*Attorney*—Christel & Bean

[57] ABSTRACT

A sleeve bearing of synthetic plastic material wherein the inner and outer bearing surfaces are entirely of the plastic material. A heat conducting, reinforcing element, preferably a perforated metal sleeve, is fixed within the plastic bearing. In one embodiment, the metal sleeve is surrounded by the synthetic plastic material over its entire axial length and is exposed at one end to provide an axial heat transfering surface. In another embodiment, the sleeve is surrounded for a major portion of its length and exposed for a minor portion thereof to provide both radial and axial heat transferring surfaces.

8 Claims, 5 Drawing Figures

INVENTOR.
WARD SIEVENPIPER
BY
Christel + Bean
ATTORNEYS

INVENTOR.
WARD SIEVENPIPER
BY
Christel + Bean
ATTORNEYS

SYNTHETIC PLASTIC SLEEVE BEARING HAVING IMPROVED HEAT TRANSFER CHARACTERISTICS

BACKGROUND OF THE INVENTION

This invention relates to sleeve bearings and, more particularly, to synthetic plastic sleeve bearings having improved heat transfer characteristics.

Sleeve-type bearings are widely used in various types of machines, one example being in a hydraulic cylinder, and in the past it has been conventional to form such sleeve-type bearings of metal. Many difficulties have been encountered with the use of metal bearings, such as relatively poor wear life, need for periodic lubrication, and susceptibility to corrosion.

More recently, sleeve bearings have been proposed and patented which utilize a suitable synthetic plastic material, such as nylon or Teflon. Such synthetic plastics are desirably and advantageously resistant to physical abrasion and corrosion and have natural lubricating characteristics and low frictional coefficients. These synthetic plastic materials, however, have the disadvantage of being dimensionally unstable under pressure and temperature both while being made and during use. More specifically, such materials tend to shrink as they cool following the high temperature forming operation with the result that the cross section of a sleeve bearing becomes bowed inwardly. This result is undesirable for most bearing applications and especially in hydraulic cylinders where it would allow leakage. The shrinkage is apparently due to the slowness with which the bearing cools after the forming operation.

Such bearings have been found to experience serious dimensional changes due to the heat produced during use and sometimes even during normal changes in temperature and humidity conditions. The dimensional changes are apparently due to the slowness with which the bearing conducts heat.

One solution which has been proposed is a metal reinforcing element entirely imbedded within the synthetic plastic sleeve. This structure, however, serves only to counteract the dimensional changes rather than to eliminate the cause of such changes and proves inadequate when relatively high operating temperatures are encountered.

Another solution provides a metal reinforcing element surrounding and exposed on one, usually the outer, surface of the bearing. This type of bearing obviously is limited to applications where only one bearing surface is needed, if the advantage of the synthetic plastic bearing surface is to be utilized and would, for example, be undesirable in a hydraulic cylinder where both the inner and outer bearing surfaces must be used.

A third solution wherein a metal reinforcing element is partially imbedded in the synthetic plastic sleeve and partially exposed along one surface thereof nevertheless is limited by some metal-to-metal contact if both bearing surfaces are to be used and thus sacrifices some of the advantages otherwise obtainable from an entirely plastic bearing surface.

SUMMARY OF THE INVENTION

It is, therefore, an object of this invention to provide a sleeve bearing of synthetic plastic material which will not experience shrinkage and other dimensional changes both during cooling subsequent to the forming operation and during use when subjected to significant temperature changes.

It is a further object of this invention to provide such a sleeve bearing of synthetic plastic material wherein the heat transfer characteristics thereof are significantly enhanced in a manner whereby the inner and outer bearing surfaces remain entirely of the synthetic plastic material so as to maintain the maximum advantage in bearing operation provided by the material.

This invention provides a sleeve bearing wherein a synthetic plastic material forms the bearing surface and a heat conducting element is fixed therein. Both the inner and outer sleeve bearing surfaces are entirely and solely of synthetic plastic material. The heat conducting element is exposed in a manner so as to provide significant radial and/or axial heat transfer from a portion relatively small compared to the bearing surface but large compared to the reinforcing member.

These and other advantages and characterizing features of the present invention will become clearly apparent upon a reading of the foregoing description together with the included drawings wherein:

DETAILED DESCRIPTION OF THE PREFERRED EMBODIMENTS

Figure 1:
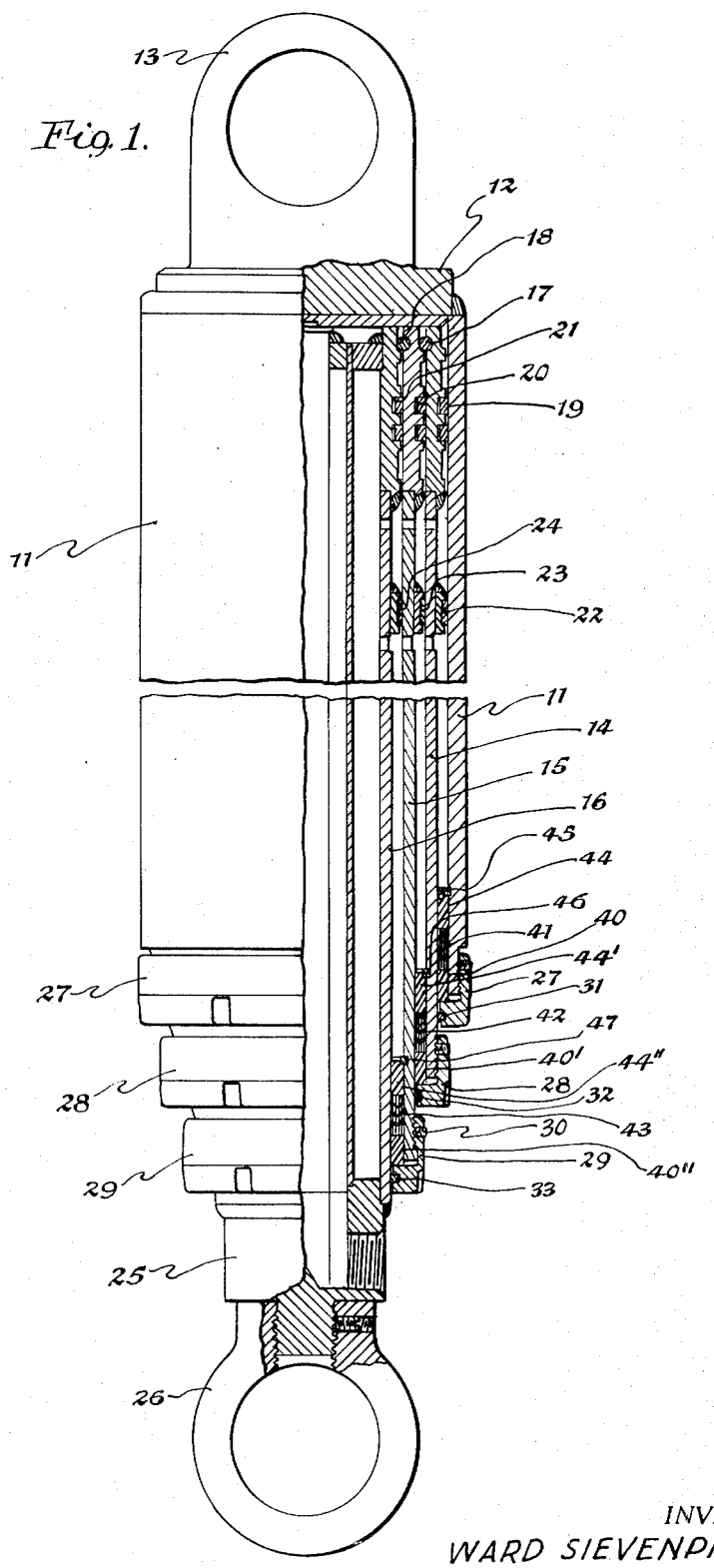
FIG. 1 is a side elevational view, partially in section, of a hydraulic cylinder equipped with two embodiments of the sleeve bearing provided by this invention.

The sleeve bearing provided by this invention may be used advantageously in an hydraulic cylinder and thus, for purposes of illustration, is shown in FIG. 1 in conjunction therewith. The hydraulic cylinder itself comprises no part of the present invention, and it should be noted that the sleeve bearing contemplated by this invention can be utilized in a wide variety of other applications.

Referring now to FIG. 1 there is shown a hydraulic cylinder 10 of the telescopic type having a tubular casing 11 which is closed at one end thereof, the upper end in FIG. 1, by an end member 12 to which is attached a connecting member 13 which enables connection of this end of the cylinder 10 to the machine in which it is employed. The hydraulic cylinder, being of the telescopic type, includes a plurality of concentric tubes within the casing 11 which are adapted to be reciprocated relative to each other and to the casing. In this particular illustration there is shown an assembly of first, second and third stage tubes 14, 15 and 16, respectively. At the upper end of the assembly there is provided a series of snap-fit retainer rings 17, 18, a series of piston rings 19, 20, 21 and a series of guide rings 22, 23, 24 for positioning and spacing the tubes in a conventional manner.

At the lower end of the hydraulic cylinder 10 a cylinder rod 25 which extends into the casing 11 within the assembly of tubes 14–16 terminates externally in a member 26 which enables connection of this end of the cylinder 10 to the machine in which it is employed. The rod 25, tubes 14–16 and casing 11 are thus disposed in a telescoping relation to each other and the spaces between casing 11 and tube 14 and between the other tubes are closed at this end by a series of end members, often designated as cartridge nuts, shown at 27–29 in FIG. 1. The members 27–29 are positioned on the end of a corresponding tube or of the casing 11 and secured thereto by suitable means such as a set screw, one of which is shown at 30. Each of the members 27–29 is provided with a corresponding wiper member 31–33, respectively, around the inner diameter thereof which contacts the particular tube which is reciprocable therethrough.

The cylinder 10 is provided at this end with the sleeve bearings of the present invention which are positioned between adjacent tubes and casing in the following manner.

One embodiment 40 of the sleeve bearing is located so that an end thereof is in contact with a corresponding one of the cartridge nuts 27–29, the prime and double prime superscripts indicating that identical bearings of progressively smaller diameters are included. Positioned adjacent the other end of each bearing 40 is a conventional packing member, designated 41, 42 and 43.

Positioned adjacent the packing members and above the bearing 40 in FIG. 1 is a second embodiment 44 of the sleeve bearing contemplated by this invention, the prime and double prime superscripts again indicating that identical bearings of progressively smaller diameters are included. Each bearing 44 is provided with a shoulder on the one end thereof, one purpose of which is to support a corresponding one of a series of stop rings 45–47 each of which partially fits in a recess provided on the inner surface of the corresponding outer tube or casing.

As a result of this arrangement, the hydraulic cylinder 10 is afforded all the advantages provided by sleeve bearings having inner and outer bearing surfaces entirely of synthetic plastic material. Moreover, and without sacrificing any of these advantages, the bearings themselves are constructed so as to have enhanced heat transfer characteristics which prevent the cause of dimensional changes in the bearings which would otherwise occur when they are subjected to high operating temperatures. The manner in which these results are achieved will now be described.

FIGS. 2–5 show in more detail the two embodiments of the sleeve bearing constructed in accordance with the present invention. One synthetic plastic material which can be utilized for forming the bearing is Nylon. Its low friction characteristics and resistance to chemical action and physical abrasion are desirable for bearing usage. Another desirable synthetic plastic material having similar characteristics is the tetrofluoroethylene fluorocarbon resin marketed under the trademark "Teflon."

One particular composition which was found to have highly advantageous characteristics as a bearing material consists, by weight, of 65–70 percent nylon with filler material including 25–30 percent ground fiberglass and 5 percent molybdenum disulphide. Alternatively, Teflon may be substituted for nylon in about the same proportion by weight. The fiberglass filler enhances the strength of the bearing material so as to increase its wear life, and the molybdenum disulphide enhances it lubricity.

The sleeve bearing of the present invention includes a reinforcing element of good heat conducting material fixed therein. In preferred form the element is a metal strip, such as steel, which is perforated over its entire surface and rolled to a sleeve of generally cylindrical shape. The diameter of the metal sleeve will, of course, vary in accordance with the particular bearing diameter selected.

The sleeve bearing is then formed by first placing the perforated reinforcing element in the die of a conventional injection molding machine. The synthetic plastic material is then injection molded in the metal sleeve in intimate contact with both the inner and outer surfaces thereof. During the molding operation the synthetic plastic material is extruded into the perforations of the metal sleeve. The portions of the material which project through the perforations form integral connections between the material overlying one surface of the metal sleeve and the material on the other surface of the sleeve and thus bind the whole together even though the synthetic plastic material may normally have no significant adhesion for metal.

Figure 2:
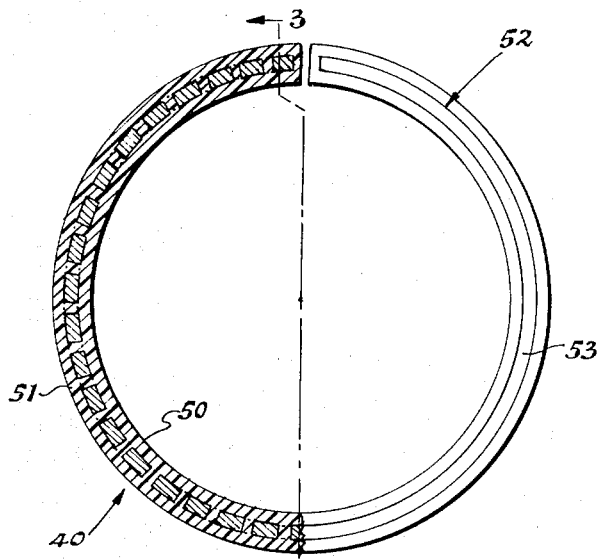
FIG. 2 is an enlarged end view, partly in section, of one of the sleeve bearings shown in FIG. 1.
Figure 3:
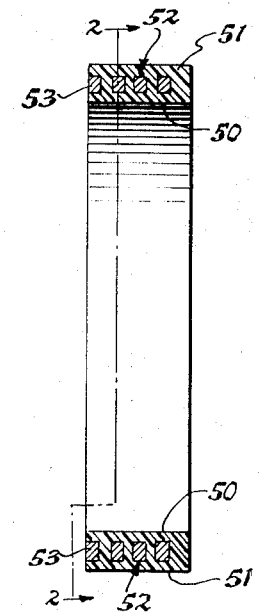
FIG. 3 is a sectional view thereof taken about on line 3—3 in FIG. 2.

It is a particular feature of the present invention that the sleeve bearing has a structure which enhances the heat transfer characteristics thereof while not requiring any sacrifice in the advantages provided by an entirely plastic bearing surface. Referring now to FIGS. 2 and 3, the sleeve bearing designated 40 in FIG. 1 is shown in greater detail. The sleeve of synthetic plastic material forms the inner and outer bearing surfaces 50 and 51, respectively, and a perforated metal sleeve 52 is fixed therein. The reinforcing element or sleeve 52 is surrounded over it entire length by the synthetic plastic material. The inner and outer bearing surfaces 50 and 51 are thus entirely of the plastic material. The sleeve 52 is exposed at one end 53 which is at the end of the sleeve bearing 40 but not on either of the bearing surfaces 50, 51. The sleeve 52 thus conducts heat axially through the bearing and the exposed end 53 transfers the heat, for example, to the surface of the injection mold after the bearing has been formed and is allowed to cool or to the surface of an adjacent part or member when the bearing is in use in a machine. This arrangement provides axial heat transfer from an area which is relatively small compared to the bearing surfaces but relatively significant compared to the heat transfering member in that it is the entire cross-sectional area thereof. As seen in FIG. 1, the exposed end 53 of sleeve 52 would be in contact with the associated nut 27–29 for transfering heat thereto.

Figure 4:
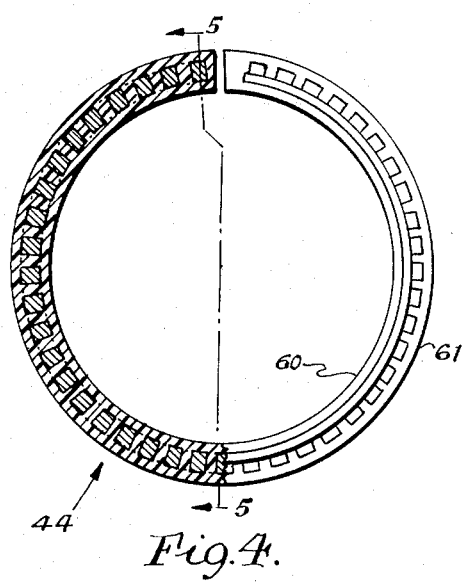
FIG. 4 is an enlarged end view, partly in section, of the other sleeve bearing shown in FIG. 1.
Figure 5:
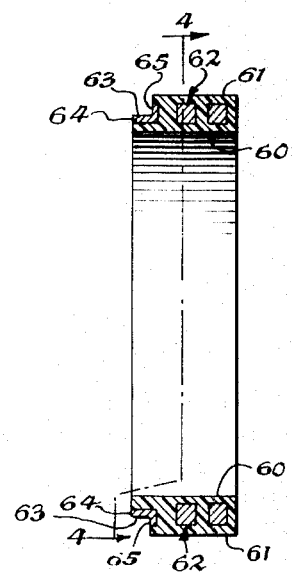
FIG. 5 is a sectional view thereof taken about on lines 5—5 in FIG. 4.

FIGS. 4 and 5 show the bearing designated 44 in FIG. 1 which, in addition to transfering heat axially, also transfers heat radially outwardly. The sleeve of synthetic plastic material forms the inner and outer bearing surfaces 60 and 61, respectively, and a perforated metal sleeve 62 is fixed therein. The reinforcing element or sleeve 62 is surrounded for a major portion of its axial length by the synthetic plastic material. This major portion is equal to the axial length of the outer bearing surface 61. In addition, the bearing is formed so that the metal sleeve is exposed both at one end thereof and for a small or minor portion of its axial length adjacent that end as shown most clearly in FIG. 5. In particular, sleeve 62 has a radially exposed heat transfering surface 63 and two axially spaced and directed heat transferring surfaces 64, 65 which are separated by the surface 63. The shoulder so defined by the surfaces 63, 65 may be formed, for example, by removing a preselected amount of the plastic material and metal sleeve by conventional machining techniques. While the bearing in this particular illustration is constructed so that the surface 63 is exposed radially outwardly, the bearing could be reversely constructed so that the surface is exposed radially inwardly without departing from the spirit and scope of this invention.

Bearing 44 thus provides a significant amount of heat transfer by virtue of the radial and axial heat transfering surfaces. This structure provides radial and axial heat transfer from a portion relatively small compared to the bearing surface but relatively large compared to the sleeve, in that the portion includes the whole cross-sectional area plus a part of the radial surface. In addition, these heat transfering surfaces define a shoulder which can support another part, for example a stop ring, when metal-to-metal contact is desired as will be explained presently.

The sleeve bearings of the present invention, having improved heat transfer characteristics, were found to cool rapidly enough after the high temperature forming process so as to avoid the problem of shrinkage. The heat conducting element, being exposed in a manner according to this invention, acts as a heat sink to hasten the cooling and setting of the plastic when the bearing cools after forming. This, in turn, prevents the bearing from bowing inwardly through the cross-section thereof. The same element when in contact with other heat conducting elements while the bearing is in use, again acts as a heat sink to enhance the transfer of heat through the bearing so as to avoid the causes of dimensional instability.

As shown in FIG. 1, bearing 40 is disposed so that the heat transfering element therein is in contact at the exposed end 53 thereof with the cylinder end member, such as cartridge nut 27. Heat is transferred in an axial direction through the bearing to the end member, which is of heat conducting material, from which it is transferred further or dissapated. The bearing 44 is disposed so that the shoulder 63, 65 at the one end thereof abuts and firmly supports an adjacent member, such as stop ring 45, 46 or 47. The shoulder is defined by the exposed heat transfering surfaces which are often and preferably of metal. When an adjacent metal member is to be supported firmly by the bearing, metal-to-metal contact is frequently preferred to metal-to-plastic contact. Heat transfer is in an axial direction through bearing 44 to the shoulder portion 63, 65 from which heat flows axially and radially and through adjacent member such as the stop ring 45–47 and casing or tube. It should be noted that the advantages of enhanced heat transfer and metal-to-metal supporting contact are provided while still having inner and outer bearing surfaces entirely of plastic material.

Accordingly, it is seen that the instant invention fully accomplishes its intended objects. While this invention has been described with specificity, this has been done by way of illustration without thought of limitation.

I claim:

1. A sleeve type bearing comprising a synthetic plastic material forming the bearing surface and an element fixed therein and formed of heat conducting material, said element having a major portion thereof embedded within said synthetic plastic material to provide inner and outer bearing surfaces entirely of said plastic material, said bearing having a shoulder formed at one end thereof exposing a minor portion of said element in radial and axial directions relative to said bearing for transferring heat in radial and axial directions.

2. The bearing as defined in claim 1 wherein said element is a hollow cylinder having one end thereof externally exposed at one end of said sleeve.

3. The bearing as defined in claim 1 wherein said element is a perforated metal hollow cylinder.

4. The bearing as defined in claim 1 wherein said synthetic plastic material consists, by weight, of about 65–70 percent resin such as Teflon or nylon, about 25–30 percent ground fiberglass and about 5 percent molybdenum disulphide.

5. The bearing as defined in claim 2 wherein a portion of said synthetic plastic material and of said cylinder is removed at one end to provide said shoulder having a radial heat transferring surface and two axial heat transferring surfaces separated by said radial surface.

6. In a hydraulic cylinder including a first cylinder reciprocable within a second cylinder spaced radially therefrom and wherein an annular closure member is secured to one end of said second cylinder and is provided with an opening sufficient to allow passage of said first cylinder therethrough, the improvement comprising:

a. a first sleeve type bearing of synthetic plastic material having an inner bearing surface contacting said first cylinder and an outer bearing contacting said second cylinder, said bearing also having a heat transferring element having a major portion thereof embedded within said inner and outer surfaces and exposed at one end thereof in radial and axial directions in a manner defining a shoulder at one end of said bearing; and b. means abutting said bearing at each end thereof for preventing axial movement thereof.

7. In a hydraulic cylinder as defined in claim 6, said means abuting said bearing comprises an annular member supported by said shoulder and held in fixed axial relation to said cylinders and a packing member at the other end of said bearing.

8. In a hydraulic cylinder as defined in claim 6, the improvement further comprising:

a. a second sleeve type bearing of synthetic plastic material having an inner bearing surface contacting said first cylinder and an outer bearing surface contacting said second cylinder, said bearing also having a heat transfering element having a major portion thereof embedded within said inner and outer surfaces and exposed at one end thereof in an axial direction; and b. said second bearing located so as to be spaced from said first bearing and being disposed so that said heat transfering element is in axial contact with said annular closure member.

* * * * *

UNITED STATES PATENT OFFICE
CERTIFICATE OF CORRECTION

Patent No. 3,722,375     Dated March 27, 1973

Inventor(s)   Ward Sievenpiper

It is certified that error appears in the above-identified patent and that said Letters Patent are hereby corrected as shown below:

In item [73] of the heading, the name of the Assignee should be A-T-O Inc.

Signed and sealed this 30th day of April 1974.

(SEAL)
Attest:

EDWARD M. FLETCHER, JR.
Attesting Officer

C. MARSHALL DANN
Commissioner of Patents